United States Patent [19]
Barnes

[11] 4,322,852
[45] Mar. 30, 1982

[54] SHADOW RESISTANT QUANTIZER FOR SIGNAL DETECTION

[75] Inventor: Richard M. Barnes, Acton, Mass.

[73] Assignee: Sperry Corporation, New York, N.Y.

[21] Appl. No.: 152,962

[22] Filed: May 23, 1980

[51] Int. Cl.³ .............................................. G06F 15/34
[52] U.S. Cl. ....................................... 375/94; 375/58; 375/99; 375/11
[58] Field of Search ..................... 375/94, 99, 58, 104, 375/103, 96, 11, 14; 343/5 VQ

[56] References Cited

U.S. PATENT DOCUMENTS

| | | | |
|---|---|---|---|
| 3,155,912 | 11/1964 | Applebaum et al. | 343/5 VQ |
| 3,758,863 | 9/1973 | Ungerboeck | 375/11 |
| 3,987,288 | 10/1976 | Franks | 375/96 |
| 4,121,295 | 10/1978 | Witt | 375/11 |

*Primary Examiner*—Glen R. Swann, III
*Attorney, Agent, or Firm*—Howard P. Terry; Seymour Levine

[57] ABSTRACT

A detection system wherein the signal levels of a plurality of resolution cells on either side of the resolution cell of interest are compared to the signal level therein. Runs of resolution cells with signal levels that exceed or do not exceed the signal level of the resolution cell of interest are taken and a run count is determined which is utilized to establish a signal detection.

6 Claims, 1 Drawing Figure

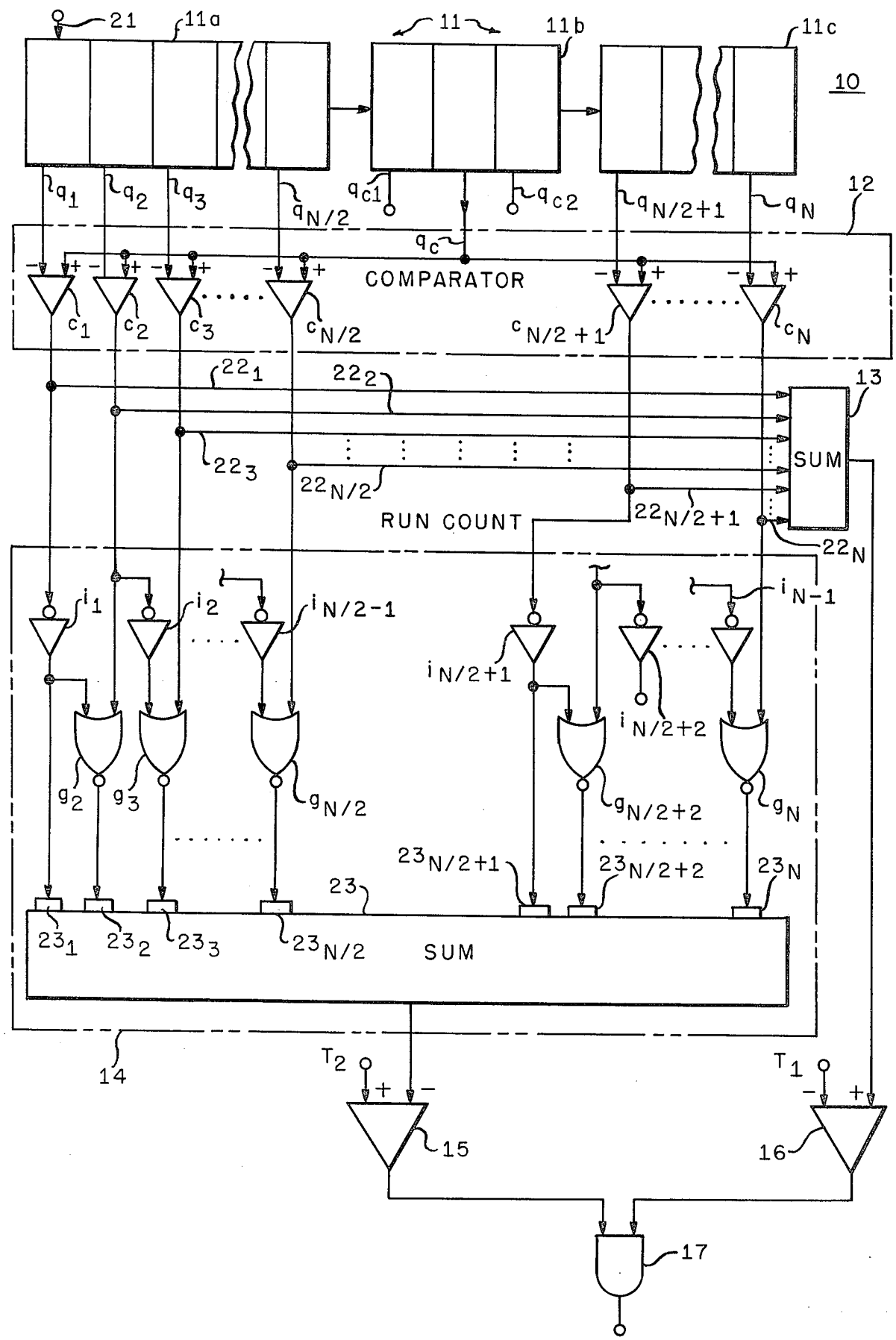

SHADOW RESISTANT QUANTIZER FOR SIGNAL DETECTION

BACKGROUND OF THE INVENTION

1. Field of the Invention

The subject invention pertains to the art of signal detection and more specifically to a quantization detection system wherein the signal level in a detection cell of interest is compared with the signal levels in detection cells on either side thereof, a signal being declared in the detection cell of interest when the signal level therein exceeds the signal level in a predetermined number of detection cells with which it is compared.

2. Description of the Prior Art

A number of detection techniques for radar, sonar, and other detection systems have been proposed in which the detection threshold is automatically adjusted in accordance with variations in background noise and interference. These systems include rank sum and rank quantization detection. A rank sum detector passes a video signal through a tapped delay line whereon the signals at each tap represent the signals within a corresponding detection cell and on which the detection cell of interest is represented by the central tap. The rank of the central tap is determined by comparing the signal amplitude thereat to the signal amplitude at each of the other taps, this rank being the number of detection cells wherein the amplitude is less than the amplitude in the detection cell represented by the central tap. When the sum of the ranks obtained over several range sweeps exceeds a specified threshold, a signal detection for the central tap is declared.

The rank quantization detector like the rank sum detector compares the signal level at the center tap of a tapped delay line to the signal levels at all the other taps. Instead of obtaining a rank sum after a number of transmitted pulses and comparing the rank sum to a given threshold, the rank quantization detector compares the rank obtained after each transmitted pulse to a specified threshold, sums the number of ranks exceeding this threshold after a number of transmitted pulses, and compares the sum to a second threshold to determine a signal detection.

These prior art systems provide approximately the same level of performance and exhibit substantially the same deficiencies. One such deficiency involves the masking of a signal in the detection cell of interest by an intefering signal in a detection cell represented by one of the taps on the tapped delay line. For example, if N taps are available on the delay line and a rank threshold equal to N is established, a signal appearing at any one of the taps on the delay line that is larger than the signal at the tap representative of the detection cell of interest will effectively prevent detection of the desired signal. In such a situation, the rank threshold may be reduced, with a concomitant increase in the false alarm rate, or the signals entering the tapped delay line may be preprocessed such that any interfering signal effects only one tap, so that a rank threshold of $N-1$ can be used. The latter approach introduces significant signal correlation between the signals appearing at the various taps along the delay lines, thus destroying the distribution free property of the rank detector.

The present invention provides a detection system which maintains a low false alarm rate and a distribution free property in the presence of relatively large interfering signals.

SUMMARY OF THE INVENTION

In accordance with the present invention, a signal in a detection cell of interest is coupled to a multiplicity of comparators each of which is additionally coupled to one detection cell of the multiplicity of detection cells positioned about the detection cell of interest. Each comparator provides a high level signal, which may be designated 1, when the signal in the detection cell of interest exceeds the signal in the detection cell corresponding to the comparator and a low level signal, designated 0, when the signal in the detection cell of interest does not exceed the signal in the detection cell corresponding to the comparator. These comparator output signals form a sequence of 1's and 0's which may contain a multiplicity of alternating runs of numeral 1's and 0's. The output signal from each comparator is coupled to a summing network which determines the count of the numeral 1's, which is the rank of the signal in the detection cell of interest. A signal representative of this rank is coupled from the summing network to a second comparator which provides a signal representative of a signal detection in the detection cell of interest when the representative rank signal exceeds a predetermined threshold. Additionally, the output signals from the multiplicity of comparators are coupled to a run count determination circuit, which in one embodiment counts the number of runs of 0's in the sequence, and in a second embodiment counts the number of runs of 1's in the sequence and provides a signal representative of this count to a comparator to which a run count threshold signal is also coupled. The run count is indicative of the number of signals in the various detection cells that interfere with the signal in the detection cell of interest, and the threshold is set to a level for permissible number of interfering signals. When the signal representative of the run count exceeds this threshold, a signal indicative thereof is provided by the comparator. The signals from the rank comparator and the run count comparator may be coupled to an AND gate which provides a detection signal when the rank and run count simultaneously exceed their respective thresholds.

BRIEF DESCRIPTION OF THE DRAWING

The sole drawing is a schematic diagram, partially in block form, of a preferred embodiment of the invention.

DESCRIPTION OF THE PREFERRED EMBODIMENTS

Referring to the FIGURE, a shadow resistant quantizer may comprise a video delay line 11, a tap comparator 12, a rank sum network 13, a run count unit 14, a run count comparator 15, a rank comparator 16, and an AND gate 17. Video delay line 11 may include three sections 11a, 11b and 11c. A train of video signals representative of the energy content in a succession of resolution cells are coupled from a radar or other pulse-echo receiver (not shown) to input terminal 21 of the tapped delay line 11 and propagate therealong until sufficient time has elapsed to have energy representative signals at each of the taps $q_1$ and $q_{N/2}$, $q_c$ and $q_{N/2+1}$ through $q_N$. At the conclusion of this epoch, the signal at tap $q_N$ is representative of the energy in the resolution cell of the earliest received echo, the signal at tap $q_c$ is representative of the energy in the resolution cell of interest, and the signal at tap $q_1$ is representative of the energy in the resolution cell of the latest received echo. The taps $q_{c1}$ and $q_{c2}$ symmetrically located about the central tap $q_c$ are not utilized, forming a guard band about the central tap $q_c$ to eliminate the appearance of extended targets in a multiplicity of resolution cells. Any number of such taps may be left uncoupled.

Central tap $q_c$ may be coupled to the positive terminal of each of a plurality of comparator units $c_1$ through $c_N$ of tap comparator 12. Each of the comparator units $c_1$ and $c_N$ is associated with a similarly indexed tap $q_1$ through $q_N$, which taps are coupled to the negative input terminal of the associated comparator unit. The signal at tap $q_c$ is compared in each of the comparator units $c_1$ through $c_N$ with the signal at the tap associated with the comparator unit, each comparator coupling a binary one signal to its output terminal when the signal level at tap $q_c$ exceeds the signal level at the tap corresponding to the comparator, and a binary zero when the signal level at tap $q_c$ does not exceed the signal level at the tap corresponding to the comparator. This binary sequence is coupled via lines $22_1$ through $22_N$ to rank sum network 13 which sums the binary sequence to establish the rank of the signal at tap $q_c$ and provides a signal representative thereof that is coupled to the positive terminal of rank comparator 16, the negative terminal of which is coupled to receive a signal $T_1$ representative of a predetermined rank threshold. The binary signal provided at the output terminal of rank comparator 16 is coupled to one input terminal of AND gate 17, this signal being a binary one when the rank representative signal exceeds the threshold signal $T_1$ and a binary zero otherwise.

Run count unit 14 may comprise a plurality of inverters $i_1$ and $i_{N/2-1}$ and $i_{N/2+1}$ through $i_{N-1}$ and a plurality of NOR gates $g_2$ through $g_{N/2}$ and $g_{N/2+2}$ through $g_N$. The input terminal of each inverter and one input terminal of each NOR gate is coupled to the output terminal of the correspondingly subscripted comparator unit of comparator 12, while the output terminal of each inverter is coupled to the second input terminal of the NOR gate subscripted one unit higher than the subscript of the inverter. Additionally, the output terminal of inverter $i_1$ and the output terminal of inverter $i_{N/2+1}$ and all the output terminals of NOR gates $g_2$ through $g_{N/2}$ and $g_{N/2+2}$ through $g_N$ are coupled to correspondingly indexed input terminals $23_1$ through $23_N$ of run sum unit 23.

Consider now the binary signals at the output terminals of comparator units $c_1$, $c_2$, and $c_3$. The binary signal $x_1$ from comparator unit $c_1$ is coupled to the input terminal of inverter $i_1$, the output terminal of which couples the inverted binary signal $\bar{x}_1$ to the input terminal $23_1$ of sum circuit 23 and to the second input terminal of NOR gate $g_2$ while the binary signal $x_2$ at the output terminal of comparator unit $c_2$ is coupled to the first input terminal of NOR gate $g_2$, the output terminal of which is coupled to the input terminal $23_2$ of sum circuit 23. The binary signal $x_2$ at the output terminal of comparator unit $c_2$ is also coupled to the input terminal of inverter $i_2$, the output terminal of which is coupled to the second input terminal of NOR gate $g_3$, the first input terminal of which is coupled to receive the binary signal $x_3$ from the output terminal of comparator unit $c_3$ and the output terminal of which is coupled to the input terminal $23_3$ of run sum unit 23. Thus, the binary signals coupled to the input terminals $23_1$, $23_2$ and $23_3$ are respectively $\bar{x}_1$, $(\overline{x_1+x_2}) = x_1 \cdot \bar{x}_2$, and $(\overline{x_2+x_3}) = x_2 \cdot \bar{x}_3$ respectively. Thus, the binary signal $z_k$ coupled to the input terminal $23_k$, where $k$ varies between 0 and $N/2$ is given by $z_k = x_{k-1} \cdot \bar{x}_k$. Since the coupling of the output terminals of the comparator units $c_{N/2+1}$ through $c_N$ to the inverters and NOR gates corresponding thereto is substantially identical to the coupling of the output terminals of comparator units $c_1$ through $c_{N/2}$ to the inverters and NOR gates corresponding thereto, it should be apparent that the binary signal $z_{N/2+1}$ coupled to the input terminal $23_{N/2+1}$ is given by $z_{N/2+1} = \bar{x}_{N/2+1}$ and $z_j = x_{j-1} \cdot \bar{x}_j$ ($j$ varying from $N/2+2$ through N). The sum $S = z_1 + z_2 + \ldots + z_N$ is the run count for the binary signals at the output terminals of the comparators $c_1$ through $c_N$ and is representative of the number of runs of zeroes in the sequence $x_1, x_2 \ldots x_N$. A signal representative of this sum is coupled to a negative terminal of run count comparator 15, to which a signal $T_2$ representative of a threshold run count is coupled to the positive terminal. Thus, comparator 15 couples a binary one to the second input terminal of AND gate 17 whenever the run count from run count network 23 does not exceed the threshold signal $T_2$. Consequently, the output of the AND gate 17 is a binary one indicative of a signal detection at the center tap $q_c$ when the sum rank of the signal at tap $q_c$ exceeds a preselected level and the run count, the number of runs of adjacent zeroes at the output terminals of the comparators, does not exceed a second predetermined level.

Consider a delay line having 25 taps, 12 taps on either side of the center tap $q_c$ for which the $z_r$ is given as $$z_1 = \bar{x}_1$$
$$z_2 = x_1 \cdot \bar{x}_2$$
$$z_3 = x_2 \cdot \bar{x}_3$$
$$\vdots$$
$$z_{12} = x_{11} \cdot \bar{x}_{12}$$
$$z_{13} = \bar{x}_{13}$$
$$z_{14} = x_{13} \cdot \bar{x}_{14}$$
$$z_{15} = x_{14} \cdot \bar{x}_{15}$$
$$\vdots$$
$$z_{24} = x_{23} \cdot \bar{x}_{24}$$

Assume that the binary signals at the output terminals of the comparators $c_1$ through $c_{24}$ forms the binary sequence 1 1 1 0 0 0 1 1 1 0 1 1 1 1 1 0 0 1 1 0 0 0 0 0 This sequence contains four runs of zeroes and the logic circuit described above will provide a run count of four. In actuality, this run count is the sum of the number of runs of binary zeroes at the output terminals of the comparators corresponding to the taps on the delay line preceding the center tap and the number of runs of binary zeroes at the output terminals of the comparators corresponding to the taps on the delay line subsequent to the center tap. If the signal level at the center tap exceeds the signal levels at all the preceding and succeeding taps on the delay line, the binary signals at the output terminals of all the comparator units would be zero which would yield a run count of two, one run prior to the center tap and one run subsequent to the center tap.

A single large interfering radar return may cause the binary sequence formed by the binary signals at the output terminals of the comparator units to exhibit a single run of a multiplicity of binary signal zeroes. This interference may be handled by selecting a threshold signal for $T_2$ corresponding to a run count of one thus permitting only a single interfering return signal. Signal detection in the center tap may be permitted in the presence of multiple interfering signals by setting the threshold signal level to correspond to the multiplicity of interfering signals to be tolerated. Thus setting $T_2$ to correspond to a run count of K permits the detection of a signal at the central tap, provided the rank sum exceeds the rank sum threshold, in the presence of K interfering signals. The shadow resistant feature of the detection system may be neutralized by setting the run count threshold at a signal level corresponding to the total number of taps on the delay line about the central tap so that the run count signal coupled to the run count comparator 15 never exceeds the threshold, thus causing a binary one level signal to always be coupled to AND gate 17. Though the system as described above provides a count of the number of runs of adjacent zeroes in the binary sequence formed at the output terminals of the comparator units in comparator 12, it should be apparent to those skilled in the art that by minor modifications to the logic circuitry a count of the number of runs of binary one level signals may just as easily have been accomplished for comparison with the preselected threshold to provide a shadow resistant quantizer.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. In a signal detection system which includes a delay line having a plurality of output taps with one a central tap, a plurality of signal comparators, one associated with each tap other than the central tap wherein a signal level at the central tap is compared with a signal level at the associated tap, a signal representative of this comparison being coupled to an output terminal thereof, a summing network coupled to said comparators for determining the rank of the signal at the central tap, and a rank comparator wherein the rank is compared to a rank threshold, the improvement that said plurality of signal comparators have additionally coupled thereto, means for determining the number of runs of adjacent taps at which said signal levels exceed said signal level at said central tap, thereby establishing a run count, said run count and said rank being utilized to establish a signal detection at said central tap.

2. A signal detection system in accordance with claim 1, the improvement further including:
   means coupled to said run count means for comparing said run count with a run count threshold; and
   means coupled to said rank comparator and said run count comparator means for indicating a signal detection at said central tap when said rank and run count are of specified levels.

3. A signal detection system in accordance with claim 2 wherein said run count means comprises:
   a plurality of inverters, each associated with one of said signal comparators having an output terminal and an input terminal coupled to said output terminal of said associated comparator;
   a plurality of NOR gates, each associated with one of said signal comparators and one of said inverters, having a first input terminal coupled to said output terminal of said associated inverter, a second input terminal coupled to said output terminal of said associated comparator, and an output terminal; and
   means coupled to said output terminals of said plurality of NOR gates and to at least two of said output terminals of said plurality of inverters and having an output terminal coupled to said run count comparator means for coupling a sum of signals coupled thereto to said run count comparator means.

4. A method of detecting signals with a system having a delay with a plurality of output taps, one of which is a central tap, a plurality of signal comparators, in each of which a signal at the central tap is compared with a signal from one of the plurality of other taps, a sum network for determining the rank at the central tap, and a rank comparator wherein the rank is compared to a rank threshold comprising the steps of:
   determining the number of runs of adjacent taps at which said signal levels exceed said signal level at said central tap thereby establishing a run count;
   comparing said run count with a run count threshold; and
   indicating a signal detection when said rank and said run count are of specified levels.

5. In a signal detection system which includes a delay line having a plurality of output taps with one a central tap, a plurality of signal comparators, one associated with each tap other than the central tap wherein a signal level at the central tap is compared with a signal level at the associated tap, a signal representative of this comparison being coupled to an output terminal thereof, a summing network coupled to said comparators for determining the rank of the signal at the central tap, and a rank comparator wherein the rank is compared to a rank threshold, the improvement that said plurality of signal comparators have additionally coupled thereto, means for determining the number of runs of adjacent taps at which said signal levels do not exceed said signal level at said central tap, thereby establishing a run count, said run count and said rank being utilized to establish a signal detection at said central tap.

6. A method of detecting signals with a system having a delay with a plurality of output taps, one of which is a central tap, a plurality of signal comparators, in each of which a signal at the central tap is compared with a signal from one of the plurality of other taps, a sum network for determining the rank at the central tap, and a rank comparator wherein the rank is compared to a rank threshold comprising the steps of:
   determining the number of runs of adjacent taps at which said signal levels do not exceed said signal level at said central tap thereby establishing a run count;
   comparing said run count with a run count threshold; and
   indicating a signal detection when said rank and said run count are of specified levels.

* * * * *